United States Patent
Cooper

[15] 3,651,787
[45] Mar. 28, 1972

[54] ADJUSTABLE PET FEEDING STAND

[72] Inventor: Pauline E. Cooper, Route 2, P.O. Box 65, Harrisburg, Oreg. 97446

[22] Filed: Apr. 22, 1970

[21] Appl. No.: 30,786

[52] U.S. Cl. .............................. 119/51, 119/51.5, 119/61
[51] Int. Cl. ........................................................ A01k 05/00
[58] Field of Search ............................... 119/51, 51.5, 61

[56] References Cited

UNITED STATES PATENTS

| | | | |
|---|---|---|---|
| 2,213,416 | 9/1940 | Slawson | 119/61 |
| 1,896,096 | 2/1933 | Parker | 119/61 |
| 2,534,114 | 12/1950 | Faris | 119/61 |
| 2,742,877 | 4/1956 | Stoner | 119/61 |
| 2,845,896 | 8/1958 | Copeland | 119/51 |

*Primary Examiner*—Hugh R. Chamblee
*Attorney*—James D. Givnan, Jr.

[57] ABSTRACT

A feeding stand for household pets and having adjustable support members which upon downward extension raise the food supporting base to a desired height above the floor surface according to the size of the animal being fed. The support members may be fully retracted to locate the stand in a lowermost position whereat the side walls and back wall are in resting contact with the floor surface.

2 Claims, 4 Drawing Figures

PATENTED MAR 28 1972    3,651,787

INVENTOR
PAULINE E. COOPER

BY James... 
AGENT

ADJUSTABLE PET FEEDING STAND

BACKGROUND OF THE INVENTION

The present invention relates to the structure for supporting food and water for a household pet at adjustable levels above the floor or ground surface.

To the extent known, the prior art discloses various holders for household pet feeding dishes their purpose being primarily the prevention of accidental upsetting of the dishes. The present stand disclosed, in addition to providing for the foregoing, embodies adjustable support for progressively raising the feeding platform as the pet grows. The providing of the food above the floor level is deemed beneficial to the animal and particularly so to the larger canine breeds. Ideally the food is best supported at a height permitting the animal to eat in a substantially normal posture without exaggerated lowering or raising of the animal's head.

SUMMARY OF THE INVENTION

The present invention is embodied within an animal feeding stand having extensible support members which may be retracted into a non-used position along the side walls of the stand permitting the latter to rest in a lowermost position directly upon the floor surface. As the pet grows the supports are periodically extended downward to provide a raised food supporting platform of the proper height.

A further object of the invention is to provide a feeding stand having adjustable supports attached thereto in a sturdy manner to provide rigid support of the stand not susceptible to damage or upsetting by the animal. The adjustable supports are braced against displacement by surface to surface contact with the side walls of the stand with removable fasteners extending therethrough. The fasteners are removable for adjustment purposes and are located away from the food area. A series of fastener openings extend along the length of each adjustable support through which the fasteners are selectively inserted and which fasteners extend through pairs of openings in the stand's side walls. Accordingly, a wide range of stand heights is possible to accommodate all sizes of household pets at their various stages of growth.

Means are further provided for the feeding of more than one animal, said means constituting a partition dividing the food supporting platform.

A further object is to provide an adjustable stand which upon retracting of the adjustable supports is of a compact and portable nature.

DESCRIPTION OF THE PREFERRED EMBODIMENT

Figures 1, 2, 3, 4:
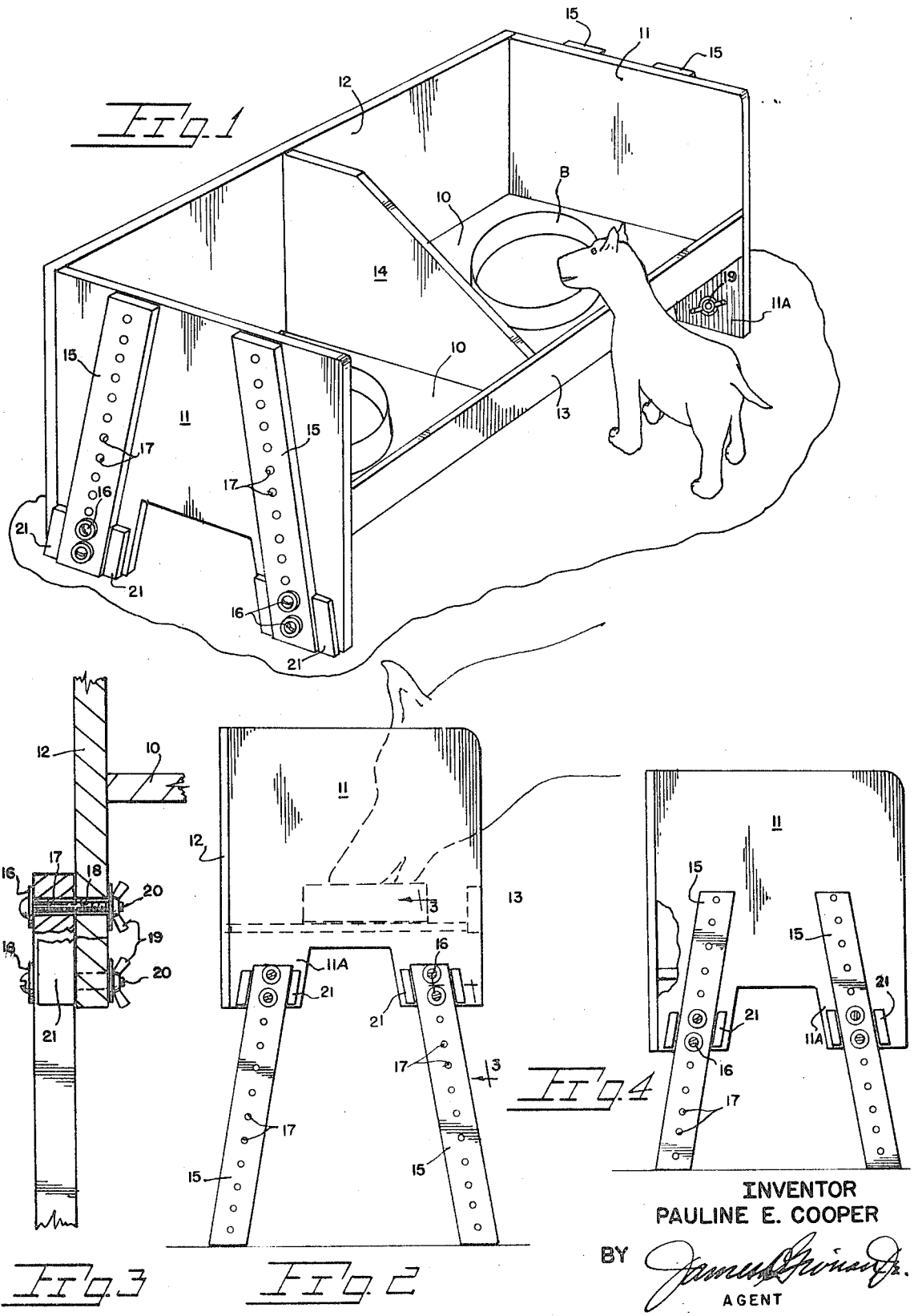
FIG. 1 is a perspective view of the adjustable pet feeding stand at its lowermost position with the support members retracted.
FIG. 2 is the side elevational view of the stand adjusted to its maximum height with the support members fully extended.
FIG. 3 is a sectional view taken along line 3—3 of FIG. 2 showing details of the attachment of the supports to the stand side walls.
FIG. 4 is a view similar to FIG. 2 with the supporting members approximately halfway extended.

With continuing reference to the drawing wherein applied reference numerals indicate parts similarly identified in the following specification reference numeral 10 indicates a food supporting platform extending lengthwise of the stand and serving as a food supporting surface.

Extending above and below the ends of platform 10 are side walls 11 with a back wall being indicated at 12 of similar height extending the length of the platform. A front barrier at 13, opposite the back wall, confines food and water bowls B as does a center partition at 14. The partition additionally serves to define the individual feeding areas.

Each side wall 11 of the stand has leg portions 11A which at the lowermost position of the feeding stand rest on the floor or ground surface as shown in FIG. 1.

With continuing reference to FIG. 1 pairs of adjustable supports 15 are shown fully retracted and lying in surface contact against the outer surface of side walls 11. The stand is shown therein configured for feeding very small breeds of dogs or cats as well as very young dogs. The adjustable supports are each held in place by attachment means comprising pairs of fastener assemblies at 16 extending through apertures 17 in the supports and aligned apertures 18 in the side walls. For the sake of convenience the attachment means may include a wing nut 19 (FIG. 3) to permit removal of a bolt 20 without the use of any tools.

Affixed to the leg portion 11A and bracing adjustable supports 15 are guides 21 spaced to permit close sliding linear movement of the support 15 therebetween.

The guides function to align the openings 17 and 18 during positioning movement of the supports. Further the guides 21 assist in bearing loads applied to the feeding stand as for instance by the animal putting forepaws on the platform 10.

The adjustable supports 15 are inclined with respect to the stand's longitudinal centerline for purposes of stability and appearance. The stand's portability may be enhanced by handles (not shown) attached adjacent the upper edges of the side walls or alternatively by providing elongate openings therein serving as handholds. The construction of the present device may be of the type termed "knocked down" in that the base, side walls, back wall, and partition may be of wood components fastened by removable wood screws which upon removal permit convenient packaging of all of the components for transport or shipping.

Having thus described the present invention what I desire to secure under a Letters Patent:

1. A feeding stand for dogs for the support of food and water containers at an optimum height above the ground according to the dog being fed, said stand comprising, a food supporting platform, a back wall and a pair of oppositely located vertical side walls disposed perpendicularly to said platform, said side walls extending below the platform and terminating downwardly in floor engaging leg portions to support the feeding stand when in its lowermost position, said leg portions having apertures therein for the reception of fasteners, pairs of extensible support members in planar surface contact with the outer surface of each of said vertical side walls, each of said support members being of a length substantially equal to the height of the side walls and having a lengthwise row of apertures extending transversely therethrough, pairs of elongate guides affixed exteriorly to said leg portions with each pair of guides slidably receiving a support member therebetween, fastening elements extending through said apertures and through the apertures in said leg portions to adjustably mount the support members, and said support members being reinforced against undesired movement by the pairs of elongate guides confining the support members against movement in one direction while the fasteners serve to retain the support members in surface abutment with said side walls to reinforce the support members against undesired movement in a direction normal to the first mentioned direction.

2. The feeding stand as claimed in claim 1 wherein said pairs of elongate guides are secured to said side walls in an inclined manner with said support members confined therebetween for extensible positioning downwardly and outwardly from their respective side walls to provide a stable support for the feeding stand even when said support members are fully extended.

* * * * *